US005314146A

United States Patent [19]
Chicoine et al.

[11] Patent Number: 5,314,146
[45] Date of Patent: May 24, 1994

[54] MULTI-MISSION SPACECRAFT BUS HAVING SPACE FRAME STRUCTURAL DESIGN

[75] Inventors: Gerald M. Chicoine; G. Joseph Klupar, both of Mesa, Ariz.

[73] Assignee: Spectrum Astro, Inc., Gilbert, Ariz.

[21] Appl. No.: 851,043

[22] Filed: Mar. 13, 1992

[51] Int. Cl.⁵ .............................................. B64G 1/22
[52] U.S. Cl. ............................................... 244/158 R
[58] Field of Search .................. 244/158 R, 159, 161, 244/163, 172

[56] References Cited

U.S. PATENT DOCUMENTS

| | | | |
|---|---|---|---|
| 4,397,434 | 7/1983 | Gounder | 244/158 |
| 4,580,748 | 4/1986 | Dalby | 244/158 R |
| 4,664,343 | 5/1987 | Lofts et al. | 244/158 R |
| 4,682,744 | 8/1983 | Farnham | 244/158 |
| 4,771,971 | 9/1988 | Ludwig et al. | 244/158 |
| 4,880,187 | 11/1989 | Rourke et al. | 244/172 |
| 4,943,014 | 7/1990 | Harwood et al. | 244/158 R |
| 4,964,596 | 10/1990 | Ganssle et al. | 244/158 |
| 5,014,936 | 5/1991 | Nauck | 244/158 |
| 5,050,821 | 9/1991 | Kernstein et al. | 244/158 |

OTHER PUBLICATIONS

Harris, "The Modular Power Subsystem for the Multi-Mission Modular Spacecraft", 789003, 1978.

Primary Examiner—Galen L. Barefoot
Attorney, Agent, or Firm—Graham & James

[57] ABSTRACT

A multi-mission spacecraft bus structure is provided which has a plurality of internal thermally-isolated cells, and a plurality of external mounting surfaces The spacecraft bus structure comprises a plurality of half frame panels, which are secured to plurality of longerons. The half-frame panels each have a pair of broad planar surfaces, a center abutting surface, a pair of end-abutting surfaces, and a pair of miter joint surfaces. Adjacent half-frame panels can either join at the center abutting surfaces, or at the edge mounting surfaces The bus structure is further sealed at the top and at the bottom by mounting plates. External electrical equipment bays can be secured to a plurality of the external mounting surfaces. Externally mounted radiators are provided to remove excess heat from the internal cells. The radiators each face in directions distinct from each other.

13 Claims, 5 Drawing Sheets

MULTI-MISSION SPACECRAFT BUS HAVING SPACE FRAME STRUCTURAL DESIGN

This invention has been reduced to practice under contract with the U.S. Government, U.S. Air Force, Contract No. F29601-90-C-0029, which as a license to practice the invention.

BACKGROUND OF THE INVENTION

Field of the Invention

The present invention relates to space satellite system architecture, and more particularly, to a multi-mission spacecraft bus having improved structural, thermal and accessibility characteristics.

Description of Related Art

Space satellite systems play a critical role in today's modern society These orbiting satellites perform a diverse number of military and civilian missions, including earth mapping, navigation, communications, atmospheric/environmental sensing, early warning/ targeting, and scientific research and experimentation. Earth orbiting satellites can either be positioned into a high earth orbit, or geosynchronous orbit, in which the satellite appears to hover over a specific equatorial point of the earth, or low earth orbit, in which the satellite rotates many times around the earth in a given day, obtaining data on the entire globe. At any given moment, hundreds of space satellites are in orbit, providing dedicated and specific services to its ground users.

Although many such satellites are built and flown each year, their total numbers are still very low. For this reason, many conventional manufacturing techniques, such as common to the building of automobiles or television sets, have failed to be incorporated into the development of spacecraft systems. This is because the typical satellite system is designed and built for a specific intended purpose, and most of its components are custom made for that purpose. Interchangeability of components between different satellite systems is extremely rare. Purchasers of space satellite systems usually only buy a small number at a time and the manufacturers have little incentive to introduce mass production techniques. One drawback of this is that as new ideas or technologies are developed, it is virtually impossible to incorporate these new techniques into existing designs, short of redesigning the entire spacecraft system.

It has long been desired to provide a basic multi-mission spacecraft structure which can be adapted for use in a variety of roles. This basic structure, known as a spacecraft bus, would interface with the launch vehicle, and provide basic housekeeping functions for the specific payload. The payload is the specific sensor or instrument which provides the core function of the specific satellite mission. The housekeeping functions include power generation, station keeping, thermal control, and ground communications. To provide power generation, many satellites use solar panels. The solar panels have light sensitive cells which convert light energy into electricity. The solar panels must be continually adjusted to maintain an optimum angle with the sun. To provide thermal control, a spacecraft system must be able to eliminate excess heat. Radiators are often used to eliminate such heat, and thermal blankets are used to insulate sensitive components and reflect light energy away from the spacecraft.

Station keeping involves the maintenance of the spacecraft in its proper orbital position. Spacecraft systems are typically either spin stabilized, or three access stabilized. A spin stabilized spacecraft continually rotates upon a center axis, behaving like a gyroscope. This gyroscopic action tends to maintain the spacecraft pointing in a given direction. Minor adjustments in the direction can be achieved through the use of thrusters which expel gas in a given direction to reorient the position of the vehicle. Three access stabilized satellites do not spin, but instead rely upon a complex network of sensors and positioning systems. The sensors include gyroscopes which can provide instantaneous position information. This information can be provided to the positioning system which compensates the actual spacecraft position to return it to its intended position. These positioning systems often include thrusters, as discussed above, as well as momentum wheels and reaction wheels. Both types of wheels operate on the principal that their spinning can either impart or eliminate satellite motion. The momentum wheels can be spun by the use of a motor, and their spinning can cause the satellite to rotate in the opposite direction. The reaction wheels are free to move in response to other forces acting upon the satellite to absorb the undesired forces. Stored energy, or rotational momentum, built up in the momentum or reaction wheels can be dissipated through the controlled usage of the thrusters.

Spacecraft ground communication is necessary to operate the spacecraft, and includes an information receiving and transmitting capability. An onboard transmitter/receiver is provided to decode signals received from the ground and relay them either to the payload or to the intended housekeeping system. Antennas are typically provided on an outer portion of the spacecraft structure to receive and transmit these signals. Frequently the antenna must be gimballed in order to maintain an optimal pointing angle with the associated ground transmitting system.

Each of these diverse systems must be housed together in a compact bus structure. The bus must also be capable of securing to the launching system, and be able to separate itself from the launching system. Moreover, the bus must be capable of withstanding the enormous loading which occurs during the launch and separation.

A typical prior art bus configuration is shown generally at 10 in FIG. 1. This configuration, known as a "thrust tube," has a generally cylindrical structure 16, having upper and lower receiving flanges shown at 14 and 12, for mounting to the launch vehicle and to the payload, respectively. The thrust tube design approach has many desirable structural features. Structural load paths are concurrent with the launch vehicle and transition directly from the launch vehicle separation system and up through the payload interface. A propulsion tank 18 can be typically provided at the center of the thrust tube structure 16. The thrust tube shape provides a large, closed section structure having efficient shear, torsional, and longitudinal load carrying capability. A non-load bearing frame 24 can mount to the structure 16, which supports external equipment, such as solar panels 22. The compact and symmetric shape of the thrust tube design makes it an ideal candidate for use in a spin stabilized configuration.

However, the structural efficiency of the thrust tube is balanced by the increased manufacturing complexity and inefficient component integration. It is relatively difficult to manufacture a balanced, circular structure, and to custom fit the components which must mount to the structure. Essentially, spacecraft designers must put a square peg (internal electronic components) into a round hole (thrust tube structure). Moreover, once the components are custom fit into the internal portions of the thrust tube, their subsequent removal requires a disassembly of the entire bus structure 16. Such removal may be necessary if internal components fail during ground test, or if technological advancements are desired to upgrade the components.

An alternative to the thrust tube structure is known as the outside shell structure, which is shown generally at 30 in FIG. 2. The outside shell structure is a variation of the thrust tube structure, being generally circular but formed of a plurality of flat surfaces. The outside shell structure shown in FIG. 2 is octagonally shaped, having eight external panels 32 which are individually removable. The top 37 and bottom 39 of the shell can be sealed, with the bottom portion providing an adaptor interface with the launch vehicle. The upper surface 37 provides a mounting point for the payload. As with the thrust tube design, the outside shell alternative uses the external panels 32 to carry the primary structural loads. The interior volume can accommodate the propulsion tanks 34 as well as the electronic equipment. The multi-sided structure creates pie-shaped equipment mounting areas, which after incorporation of the propulsive elements limits the available equipment stowage volume. This limited electronics area constrains the ability of the design to incorporate developmental equipment, as with the thrust tube. An additional problem with the outside shell design is that the external panels used for internally mounting the equipment are necessary for the vehicle structure. The equipment panels cannot be removed, nor can the interior equipment be accessed, without removal of these primary structural elements.

An additional problem with both the thrust tube and the outside shell designs, is that of effective thermal management. In each design, the onboard electronics equipment is stowed within the large, central compartment formed by the tube or shell. Heat generated by these electronic systems must be removed from the structure to prevent damage due to overheating the delicate components. Heat generated within the structure would rapidly flow to each of the other components within the compartment. Thus, the shape of the structures renders it difficult to thermally isolate critical components and reject the built-up heat.

Thus, it would be desirable to provide a standard multi-mission spacecraft bus structure having improved load carrying and equipment mounting capability over the prior art. It would also be desirable to provide a multi-mission bus structure having components which are accessible from external to the structure. It would be still further desirable to provide a multi-mission bus structure having decentralized thermal removal capabilities.

SUMMARY OF THE INVENTION

Accordingly, a principal object of the present invention is to provide a multi-mission bus structure for a spacecraft utilizing a "space frame" configuration having decentralized internal cells and externally mounted equipment storage bays.

Another object of the present invention is to provide a multi-mission spacecraft bus having decentralized passive thermal control.

An additional object is to provide a bus structure which is relatively easy and inexpensive to manufacture.

In accomplishing these and other objects, there is provided a spacecraft bus structure having a plurality of half frame panels and a plurality of longerons. The half frame panels each have a pair of broad planar surfaces, a center abutting surface, a pair of end abutting surfaces and a pair of miter joint surfaces. Adjacent ones of the half frame panels join at the center abutting surfaces, allowing the broad planar surfaces to flair outwardly relative each other. The longerons have edge mounting surfaces which can be affixed to the miter joint surfaces of the half frame panels. A completed space frame structure resembles a honeycomb configuration. The space frame is sealed at the top and the bottom by mounting plates. Side panels can be further affixed joining the adjacent longerons. The assembled structure results in four internal cells and six external mounting surfaces.

In an alternative embodiment of the present invention, individual electronics bays are provided on four of the external mounting surfaces of the spacecraft bus structure. Each of the electronics bays are self-contained, having spaces for the installation of subassemblies. Each of the subassemblies have slots for the insertion of individual circuit cards. The electronics bays would each have a lockable front cover which permits access from external to the spacecraft bus.

In another embodiment of the present invention, thermal radiators would be provided on many of the external mounting surfaces, including surfaces of the electronics bays. Each of the thermal radiators would be capable of removing heat generated within an associated cell of the spacecraft bus structure. Since the thermal radiators would each face in different directions relative each other, a portion of the radiators would always have a view to space shaded from the sun.

A more complete understanding of the multi-mission spacecraft bus of the present invention will be afforded to those skilled in the art, as well as a realization of additional advantages and objects thereof, by a consideration of the following detailed description of the preferred embodiment. Reference will be made to the appended sheets of drawings which will be first described briefly.

DESCRIPTION OF THE PREFERRED EMBODIMENTS

Figure 1:
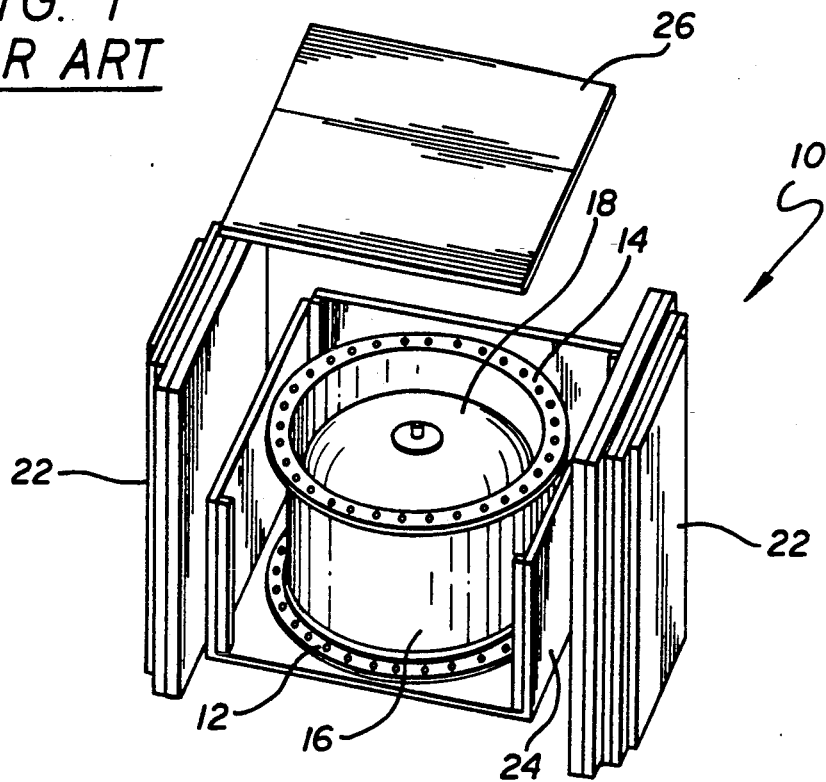
FIG. 1 is a perspective view of a prior art thrust tube bus structure.
Figure 2:
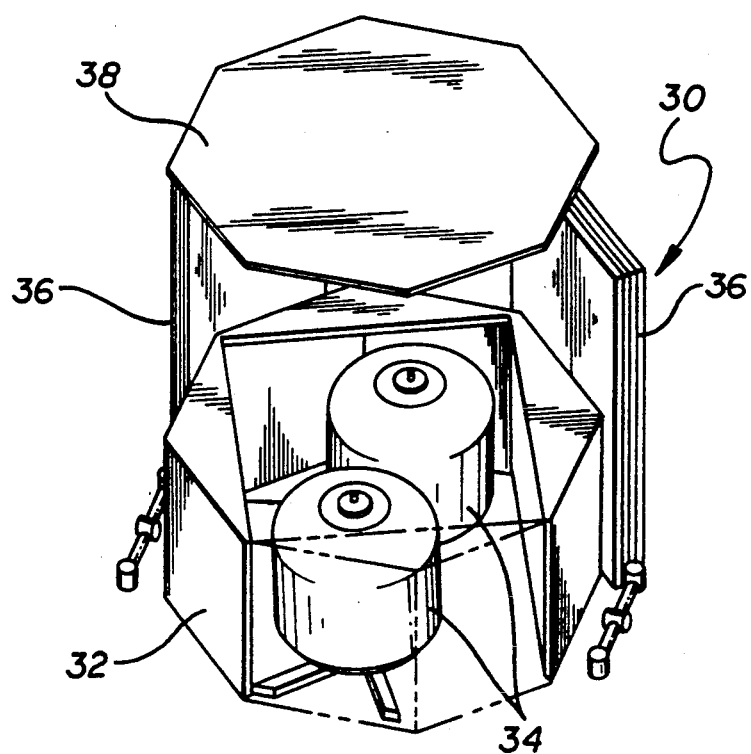
FIG. 2 is a perspective view of a prior art outside shell bus structure.
Figure 3:
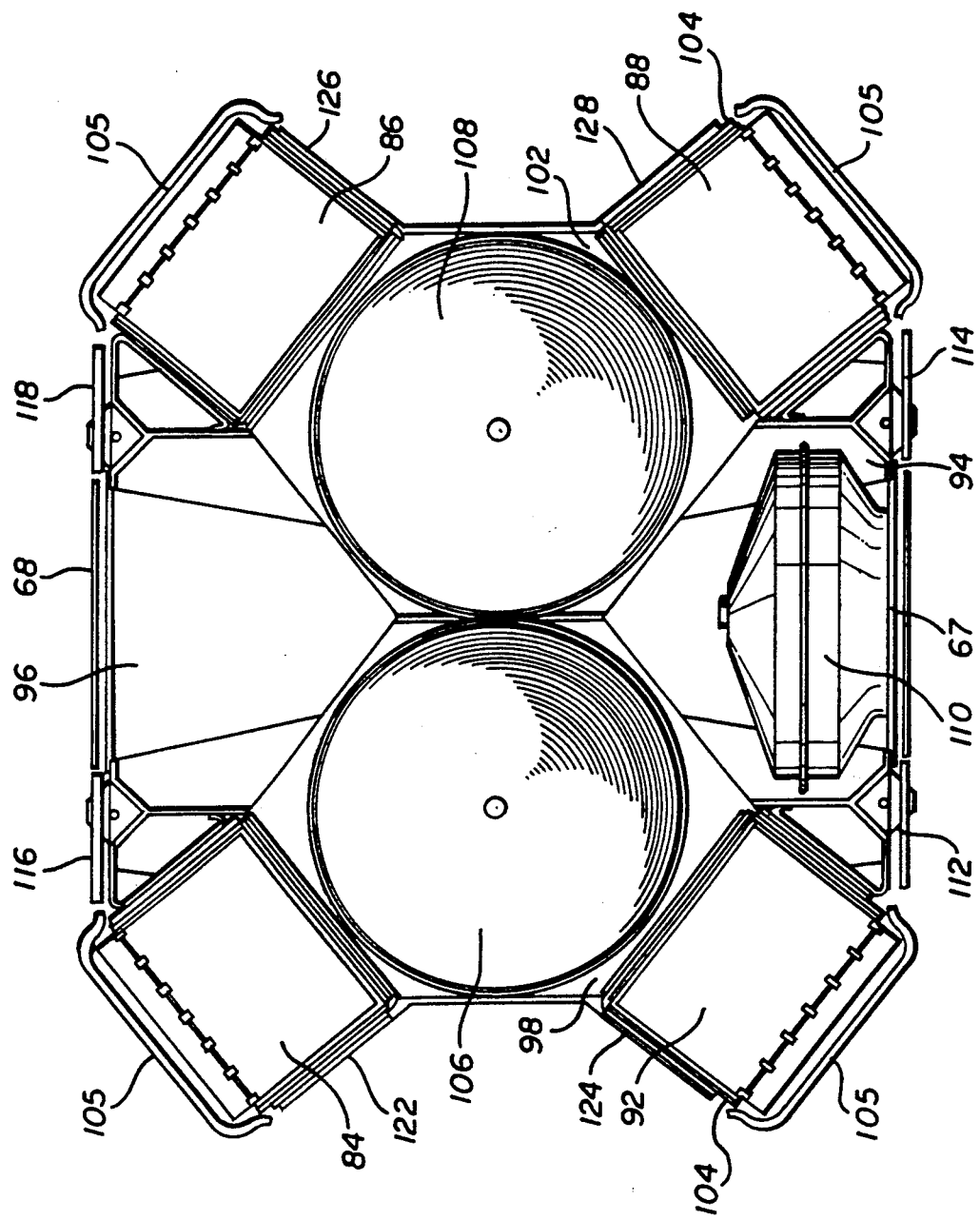
FIG. 3 is a top view of a "space frame" bus structure of the present invention.
Figure 4:
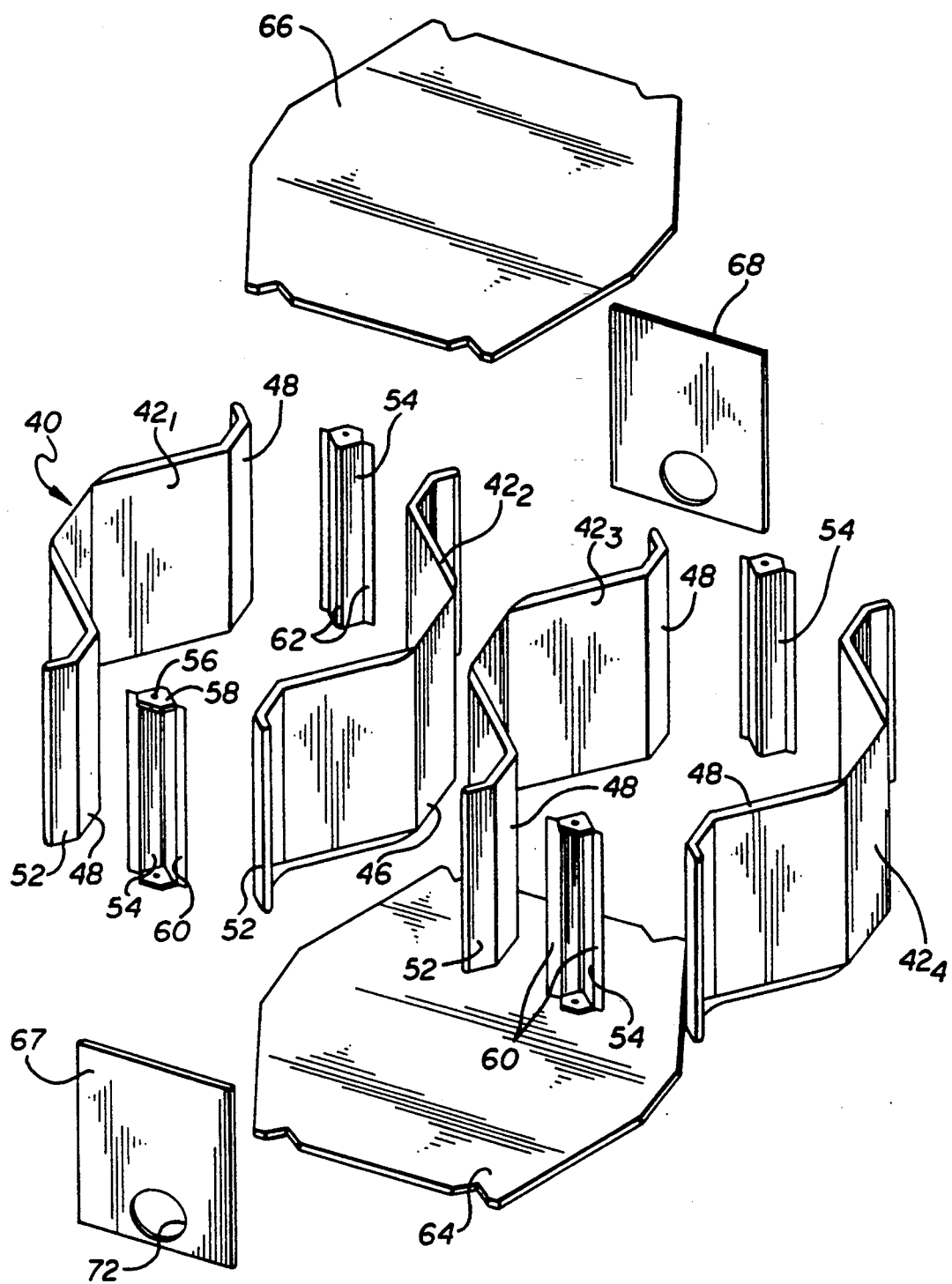
FIG. 4 is an exploded view of the space frame bus structure.

Referring now to FIGS. 3 and 4, there is shown a spacecraft bus 40 according to the present invention.

The bus 40 is formed from a plurality of half frame panels 42 which are joined together by a plurality of longerons 54. When assembled into the configuration shown in FIG. 4, the bus 40 forms four internal cells and six external mounting surfaces. As will be further described below, the internal cells provide mounting areas for the installation of propulsion tanks or other hardware. The external surfaces also provide mounting areas for the installation of other types of equipment.

As can be seen in FIG. 4, each of the half frame panels 42 are identical. The panels comprise a single sheet which is bent or formed along six vertical fold lines. As formed, the half frame panels 42 each have two broad planar surfaces 44 which are separated by a center abutting surface 46. Adjacent to each of the broad planar surfaces 44 are end abutting surfaces 48. The end abutting surfaces 48 are substantially parallel to the center abutting surface 46. Adjacent to the end abutting surfaces 48 are the miter joint surfaces 52. These miter joint surfaces are intended to secure to the longerons 54 as will be described below. It should be apparent from FIG. 4 that two adjacent half frame panels 42 can join either at the center abutting surfaces 46 (as with half frame panels $42_2$ and $42_3$), or can be joined at the end abutting surfaces 48 (such as with half frame panels $42_1$ and $42_2$, and with half frame panels $42_3$ and $42_4$).

It is anticipated that the half frame panels 42 be formed from a single sheet of material. The material can be metallic, such as aluminum or titanium, and can be bent into the desired shape using known machining techniques. It is further anticipated that lightweight composite materials also be used in forming the half frame panels 42. In that case, the vertical fold lines would be initially formed during the lay up and manufacture of the panels. It should be apparent to those skilled in the art that the manufacture of each half frame panel 42 would be relatively simple and inexpensive.

Each of the panels are further joined by the plurality of longerons 54. Each of the longerons have end surfaces 56 having bolt holes 58. The vertical extent of each of the longerons 54 has a pair of edge mount surfaces 62. These edge mount surfaces 62 form a corner having an angle equivalent to the angle formed by two adjacent ones of the miter joint surfaces 52 described above. Accordingly, the edge mounts surfaces 62 would conveniently secure to the miter joint surfaces 52 as shown in FIG. 4. The facing portions of the longerons 54 feature face mount surfaces 60. These surfaces can be used for the mounting of side panels 68 which will also be described below.

It is anticipated that the longerons 54 be machined from a single elongated block of metallic material, such as aluminum or titanium. The longerons 54 would carry the bulk of the structural load of the space frame bus structure 40. The half frame panels 42 also contribute to the load carrying capability of the bus structure 40, while additionally providing mounting surfaces for the attachment of external and internal hardware. However, the outermost ones of the half frame panels $42_1$ and $42_4$ could be removed to gain access into the structure without compromising the structural integrity of the structure.

Two side panels 67, 68 adjoin a fore and aft pair of the longerons 54 providing both an internal compartment and a mounting surface, while contributing to the structural rigidity of the bus structure 40. A base plate 64 and a top plate 66 are also provided to further enclose the structure 40. Each of these plates are identical and are shaped to mimic the generally six sided bus structure. The base plate 64 and the top plate 66 secure to the end surfaces 56 of the longerons 54 by use of bolts which secure to the bolt holes 58. The base plate 64 provides a mounting interface between the bus structure 40 and the launch vehicle. The top plate 66 provides a mounting surface between the bus structure 40 and the payload.

It is anticipated that the half frame panels 42 be formed to each other and to the longerons 54 by the use of welding. However, bolts or adhesives can also be advantageously used for this purpose.

Referring now to FIG. 3, there is shown the top view of the bus structure 40. The drawing shows each of the half frame panels 42 formed to the longerons 54 as described above. An exemplary electronics bay 104 has been secured to each of the four exposed broad planar surfaces 44. In this configuration, it should be apparent that eight individual cells are formed. Within the four electronic bays 104, there are a first electronics cell 84, a second electronics cell 86, a third electronics cell 88, and a fourth electronics cell 92. In the space between the side panels 68 and the broad planar surfaces 44 of the half frame panels $42_2$ and $42_3$ are a first auxiliary bay 94 and a second auxiliary bay 96. Lastly, within the six-sided space formed by the internal portions of the broad planar surfaces 44 and the center abutting surfaces 46 are propellant tank cells 98 and 102. It is anticipated that a first propellant tank 106 be provided in the first propellant tank cell 98 and a second propellant tank 108 be provided in the second propellant tank cell 102. The auxiliary bays 94 and 96 are anticipated to hold auxiliary equipment, such as a momentum wheel 110 shown in FIG. 3. It is additionally anticipated that solar panels be secured external to the side panels 67 and 68, and that the hardware necessary for actuation of the solar panels be housed in the auxiliary bays 94 and 96. The side panels 67 and 68 may additionally feature an access part 72 to receive a solar panel actuation device.

To effectively control the removal of heat from within the bus structure 40, a number of externally mounted radiators are provided. A first pair of radiators 112 and 114 are provided on a first side of the bus structure 40 straddling the first side panel 67. Similarly, a second pair of side radiators 116 and 118 are provided on the opposite side straddling the second side panel 68. Radiators 122, 124, 126, and 128 are mounted on each of the exposed sides of the four electronics bays 104. From this radiator mounting configuration, radiators are provided which face in six distinct directions.

To further insulate the bus structure 40, it is anticipated that the propellant tanks 106 and 108 be covered with the thermal blankets, as known in the art. These blankets will prevent heat from the electronics bays 104 from transferring into the propellant tanks 106 and 108. It is further anticipated that thermal blankets be provided on outer covers 105 of the electronics bays 104. These thermal blankets will prevent heat from reflected light to build up within the electronics bay 104.

This thermal approach isolates thermal loads into the six separate thermal management bays corresponding to the four electronics bays 104 and the two auxiliary bays 94 and 96. Each of the four electronics bays 104 have a direct radiative view to space on two opposite sides of the spacecraft. This permits a simplified design approach which does not require the transport of great quantities of heat across the body of the bus structure 40. It is anticipated that the type equipment mounted into the two auxiliary bays 94 and 96 would remain generally constant from mission to mission, and sizing of a radiator for this equipment would remain standard. Since the equipment placed in the electronics bays 104 could vary dramatically from mission to mission, the size of radiators 122, 124, 126, and 128 would vary accordingly.

Figure 6:
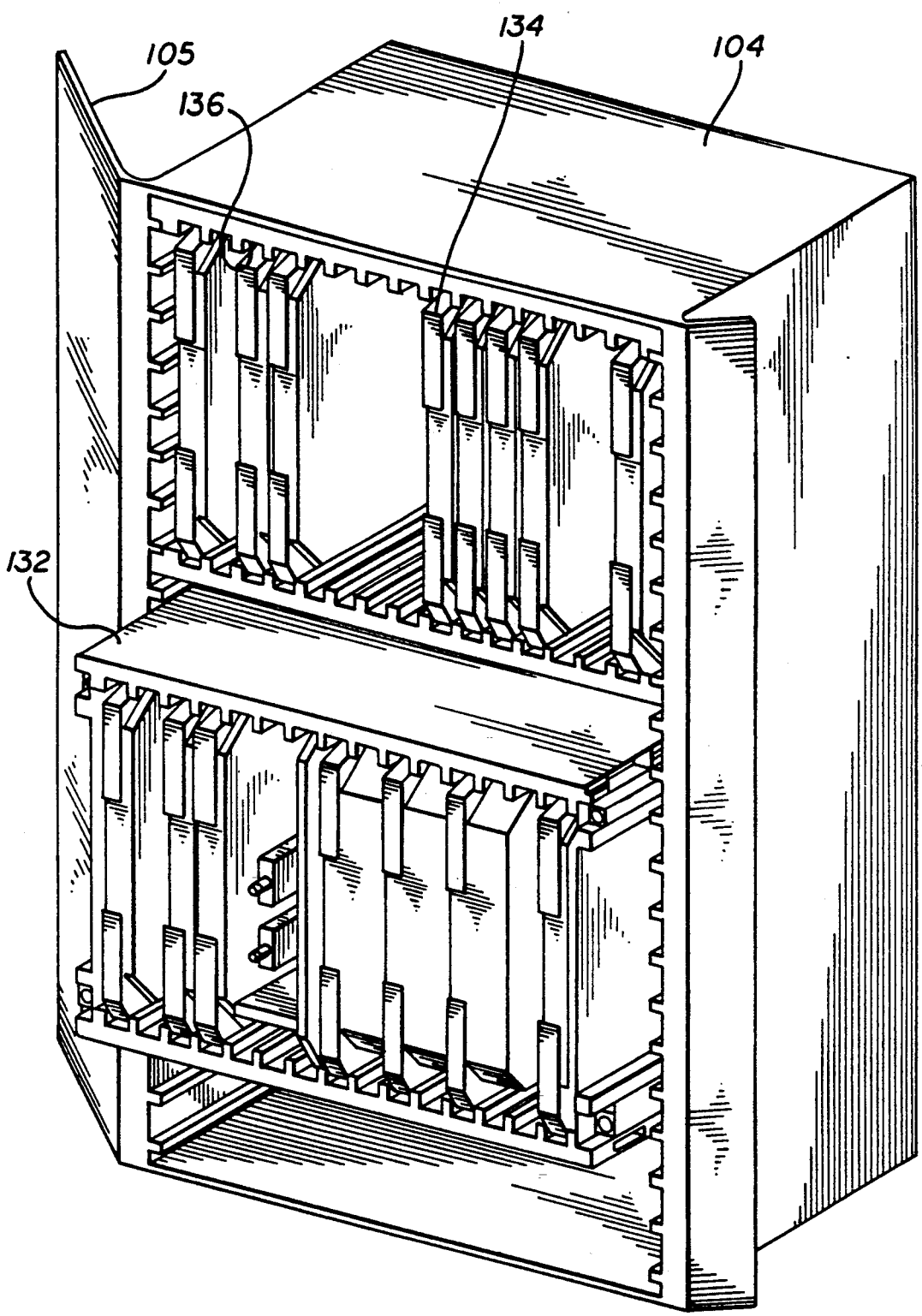
FIG. 6 is a perspective view of an externally mounted electronics bay having removable card racks and module subassemblies.

Referring now to FIG. 6, there is shown a perspective view of one of the electronics bay 104. The bay comprises a generally rectangular cabinet having a front cover 105, as described above. The electronics bay 104 can be equipped to hold a pair of electronics subassemblies 132. The subassemblies 132 install into the electronics bay 104 and are clamped in place with wedge locking devices. Each of the subassemblies 132 would have a plurality of slots 136, with each slot configured to receive a circuit card 134. It is anticipated that each of the electronics bays 104 have an internal back plane to which the subassemblies 132 and their respective cards 134 connect. It should be apparent that each electronics bay 104 can be readily modified or adapted to receive a wide variety of circuit cards 134. The circuit cards 134 would typically control many of the housekeeping functions described above, such as communications, position calculation or power management. It should be further appreciated by those skilled in the art that the circuit cards 134 can be rapidly removed and replaced to change or alter functions, or to repair failed systems, without disturbing any other element of the spacecraft.

Figure 5:
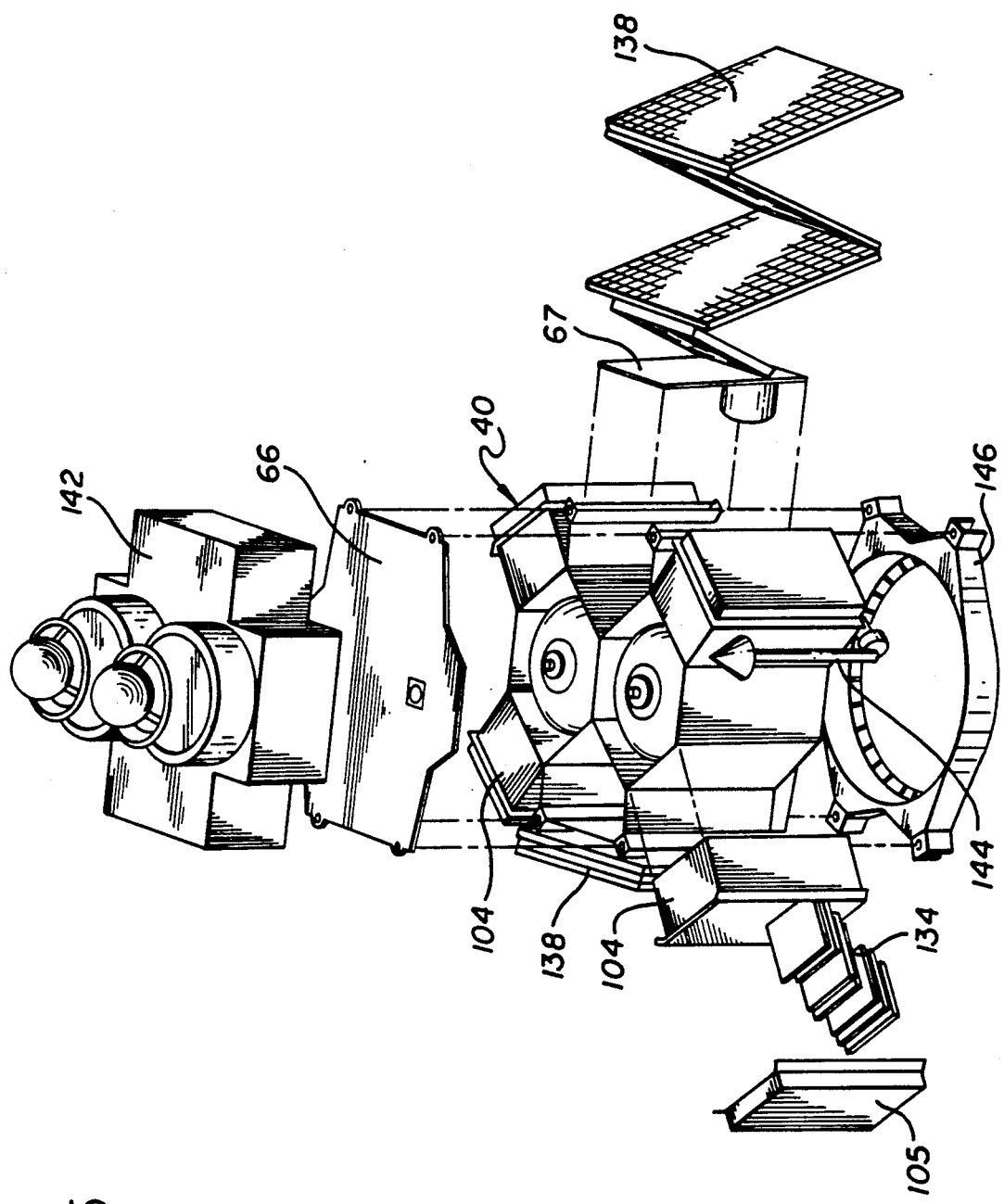
FIG. 5 is a partially exploded view of the space frame bus structure with an exemplary payload, solar panel array, communication antenna, and electronics bays affixed thereon.

Referring now to FIG. 5, there is shown the bus structure 40 in a near operational configuration. An exemplary payload 142 is provided which mounts readily onto the top panel 66. An exemplary solar panel 138 is mounted onto each of the side panels 68, with a first solar panel shown in a folded configuration and a second solar panel shown in a partially deployed configuration. Additionally, an exemplary antenna 144 has been mounted onto an exposed surface of one of the electronic bays 104. Lastly, a launch vehicle adaptor 146 is provided below the base plate 64. As known in the art, the launch vehicle adaptor 146 will enable the spacecraft bus structure 40 to be mounted above an expendable launch vehicle.

Having thus described a preferred embodiment of a multi-mission spacecraft bus, it should now be apparent to those skilled in the art that the aforestated objects and advantages for the within system have been achieved. It should also be appreciated by those skilled in the art that various modifications, adaptations, and alternative embodiments thereof may be made within the scope and spirit of the present invention. For example, while the spacecraft bus shown in FIG. 5 features four electronics bays 104, less than four can be used as well. The cell areas devoted to the propulsion tanks could be used for additional storage. These examples demonstrate the flexibility of the present invention, in that the basic vehicle can be rapidly reconfigured to fit any specific need.

The present invention is further defined by the following claims.

We claim:

1. A multi-mission spacecraft bus which adapts a payload to a launch vehicle, comprising:

a space frame structure enclosing a plurality of internal cells and having a plurality of external mounting surfaces, said structure further comprising a plurality of longerons, and a plurality of half frame panels mating to said longerons, said half frame panels enclosing said cells;

a base plate enclosing a lower portion of said space frame structure and adapting to said launch vehicle; and a top panel enclosing an upper portion of said space frame structure and adapting to said payload;

wherein said half frame panels comprise a center abutting surface, broad planar surfaces extended from either side of said center abutting surface, end abutting surfaces extending from said broad planar surfaces, and miter joint surfaces extending from said end abutting surfaces, said center abutting surface and said end abutting surfaces being substantially parallel to each other.

2. The multi-mission spacecraft bus of claim 1, wherein a first and a second one of said half-frame panels are joined at said end abutting surfaces, a third and a fourth of said half frame panels are joined at said end abutting surfaces, and said second and said third of said half-frame panels are joined at said center mounting surfaces.

3. The multi-mission spacecraft bus of claim 2, wherein:

said longerons have edge mount surfaces which secure to said miter joint surfaces, and carry primary structural load of said space frame structure.

4. The multi-mission spacecraft bus of claim 3, further comprising:

a first and a second side panel, each of said side panels joining an adjacent pair of said longerons and enclosing one of said internal cells.

5. The multi-mission spacecraft bus of claim 4, further comprising:

a plurality of externally mounted electronics bays, each of said bays securing to an exposed external surface of said space frame structure.

6. The multi-mission spacecraft bus of claim 5, wherein:

said electronics bays contain a plurality of internal slots, each of said slots capable of receiving a circuit card, each of said electronics bays further having a front cover which secures to enclose said circuit cards within said electronics bay.

7. The multi-mission spacecraft bus of claim 6, wherein:

said electronics bays are accessible only from external to said spacecraft bus.

8. The multi-mission spacecraft bus of claim 7, further comprising:

a plurality of externally mounted radiators, each of said radiators being thermally connected to individual ones of said internal cells to remove heat from said cells.

9. The multi-mission spacecraft bus of claim 8, wherein each of said radiators face in a distinct direction relative each other.

10. A multi-mission spacecraft bus structure, comprising:

a plurality of longerons and a plurality of half frame panels mated to said longerons, said structure providing a plurality of internal cells and having a plurality of external mounting surfaces, wherein said half frame panels each comprise a center abutting surface, broad planar surfaces extending from said center abutting surface, end abutting surfaces extending from said broad planar surfaces, and miter joint surfaces extending from said end abutting surfaces.

11. The multi-mission spacecraft bus structure of claim 10, wherein:
adjacent ones of said half frame panels can be joined together either at said center abutting surfaces or at said end abutting surfaces.

12. The multi-mission spacecraft bus structure of claim 11, wherein:
said longerons secure to said miter joint surfaces, and carry primary structural load of said spacecraft bus structure.

13. The multi-mission spacecraft bus structure of claim 12, further comprising:
a side panel joining an adjacent pair of said longerons and forming one of said cells in cooperation with said half frame panels.

* * * * *